United States Patent
Scholte

(10) Patent No.: US 7,768,930 B1
(45) Date of Patent: Aug. 3, 2010

(54) METHOD AND APPARATUS FOR DETERMINING PROBLEMS ON DIGITAL SYSTEMS USING AUDIBLE FEEDBACK

(75) Inventor: Alexander Martin Scholte, New South Wales (AU)

(73) Assignee: Avaya Inc, Basking Ridge, NJ (US)

( * ) Notice: Subject to any disclaimer, the term of this patent is extended or adjusted under 35 U.S.C. 154(b) by 1720 days.

(21) Appl. No.: 10/943,751

(22) Filed: Sep. 17, 2004

(51) Int. Cl.
H04L 12/26 (2006.01)
H04L 1/00 (2006.01)

(52) U.S. Cl. .................. 370/244; 370/350; 375/224; 379/1.01

(58) Field of Classification Search ............ 370/241, 370/250, 252, 244; 375/213, 224–228; 379/1.01, 379/22.03, 27.01, 32.01, 32.02
See application file for complete search history.

(56) References Cited

U.S. PATENT DOCUMENTS

| | | | |
|---|---|---|---|
| 4,112,264 A * | 9/1978 | Abramson et al. | 714/712 |
| 5,802,105 A * | 9/1998 | Tiedemann et al. | 375/225 |
| 5,802,446 A * | 9/1998 | Giorgi et al. | 455/69 |
| 5,835,565 A * | 11/1998 | Smith et al. | 379/27.04 |
| 6,618,383 B1 * | 9/2003 | Tomlins | 370/395.5 |
| 6,625,448 B1 * | 9/2003 | Stern | 455/425 |
| 7,082,172 B1 * | 7/2006 | Pringle et al. | 375/316 |
| 7,280,487 B2 * | 10/2007 | Goodman | 370/252 |
| 2002/0015387 A1 * | 2/2002 | Houh | 370/250 |
| 2002/0141392 A1 * | 10/2002 | Tezuka et al. | 370/352 |
| 2003/0093513 A1 * | 5/2003 | Hicks et al. | 709/224 |
| 2004/0252646 A1 * | 12/2004 | Adhikari et al. | 370/252 |
| 2007/0291907 A1 * | 12/2007 | Corcoran | 379/1.01 |

* cited by examiner

Primary Examiner—William Trost, IV
Assistant Examiner—Roberta A Shand
(74) Attorney, Agent, or Firm—John C. Moran

(57) ABSTRACT

A method and apparatus tests a packet switching system by requesting one of a plurality of tests on the packet switching system via a telecommunication terminal; performing the requested one of the plurality of tests on the packet switching system; and presenting results of the performed one of the plurality of tests on the telecommunication terminal.

8 Claims, 4 Drawing Sheets

METHOD AND APPARATUS FOR DETERMINING PROBLEMS ON DIGITAL SYSTEMS USING AUDIBLE FEEDBACK

TECHNICAL FIELD

This invention relates to telecommunication systems and, in particular, to the detection of problems on such systems.

BACKGROUND OF THE INVENTION

Within the prior art, the manner in which voice communication over data networks is diagnosed for problems, such as packet loss, jitter, reordering, etc., is to utilize diagnostic and monitoring tools particularly designed to diagnose network problems. Such tools are well known in analysis data transmission such as VoIP transmission. However, with the penetration of VoIP transmission into the telecommunication infrastructure it is not uncommon to only have one portion of the total telecommunication path actually being transported over a VoIP subpath. The problem that arises is that it is difficult to determine whether the problem is in the digital transmission or the problem is within the analog or digital circuit switching equipment. In addition, the person needing to make this determination may not have the necessary skills to utilize the more complex network monitoring tools or have the necessary tools. Rather, this individual needs only to identify whether it is a digital transmission problem or some other type of problem. Another situation arises where the equipment may not be available, as when the problem is occurring on an IP switching system at a customer's location. The customer needs to know whether it is their IP switching equipment that is failing or, for example, an analog or digital trunk to a circuit switching office of the public telephone network.

SUMMARY OF THE INVENTION

A method and apparatus tests a packet switching system by requesting one of a plurality of tests on the packet switching system via a telecommunication terminal; performing the requested one of the plurality of tests on the packet switching system; and presenting results of the performed one of the plurality of tests on the telecommunication terminal.

DETAILED DESCRIPTION

In an embodiment, the user selects the condition to be tested and receives the test results back as audio or visual information. The user can select that only one type of test can be done at a time or that all of the different types of tests be done simultaneously. In one embodiment, the user utilizes a standard analog telephone to request that a switching system perform the digital transmission test. In this case, the results of the test are given to the user/technician in the form of audio information. In one embodiment, network jitter test feedback is given to the technician by varying the pitch of a tone as related to interpacket arrival time where a quickly changing tone pitch and wide pitch variation would indicate the presence of jitter to the technician. In an alternative embodiment, the presence of jitter is indicated to the technician by utilizing two tones, each are at the frequency but out of phase. The center frequency of the tones is arbitrary and chosen to be in the band of permissible frequencies that can be transmitted over an analog telephone system (for example 1 kHz). One of the tone generators would be fixed at this center frequency whereas the other tone generator is 180 degrees out of phase and changes its frequency based on the observed or actual inter-packet arrival times. When packets arrive at the expected rate, the tone generators cancel each other completely. When there are differences in the expected interpacket arrival time the tone generators do not completely cancel each other's signal resulting in an audible beats frequency which would indicate to the technician the magnitude of the jitter. The embodiment where the technician is utilizing an analog telephone would be performed by the telecommunication switching system to which the analog telephone is connected. However, if the telephone being utilized is a digital telephone then the telephone itself could perform the operations if it was a VoIP telephone. In addition, in other embodiments the information could be displayed to the technician as text if the telephone being utilized has a text display. In addition, in another embodiment the display lights on the telephone could be modified to flash at different frequencies to indicate the jitter problem.

The problem of packet loss could be indicated in audio form by a simple high-pitched beep every time a packet is lost. In addition, the length or volume of the beep could be used to indicate the size of the loss (i.e. the burstiness or loss distance). The problem of the packets arriving out of order and having to be reordered could be indicated by a simple lower pitched beep every time a reordered packet is received and also the length or volume of the beep could be used to indicate the delay experienced by the reordered packet.

Figure 1:
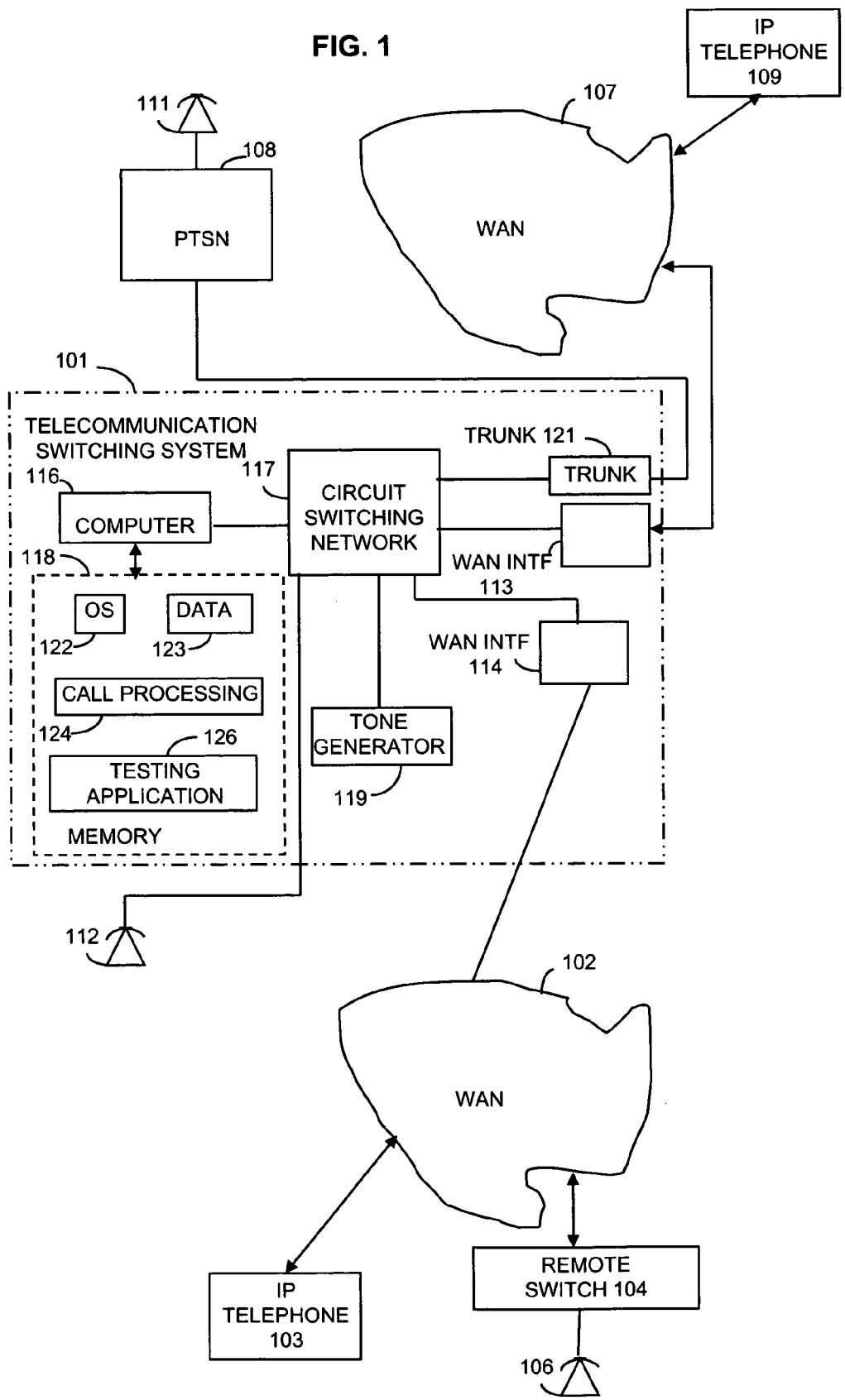
FIG. 1 illustrates an embodiment for implementing the invention.

FIG. 1 illustrates a system for implementing the various embodiments. It is assumed that telecommunication switching system 101, remote switch 104, and public telephone switching network 108 utilizes circuit switching for the communication of voice information. Wide area networks 102 and 107 are implementing a packet switching protocol such as the IP protocol for the communication of voice. The problems of packet loss, jitter, reordering, etc. can occur in WANs 102 or 107 of FIG. 1. If the problems are occurring in WAN 107 then telecommunication switching system 101 can implement the aspects of the invention to allow indications to a technician utilizing either IP telephone 103 or analog telephone 106. The audio or visual information determined by telecommunication switching system 101 would then be transmitted via WAN 102 to IP telephone 103 or analog telephone 106 via remote switch 104. If the problem is occurring in WAN 102, then, IP telephone 103 can implement an embodiment that will allow it to utilize the teachings of the invention to assist a technician in determining the type of problem. Similarly, if the problem is in WAN 102, remote switch 104 could implement aspects of the invention which would allow a technician using telephone 106 to determine the type of failure that is occurring.

Telecommunication switching system 101 of FIG. 1 is under control of computer 116 that executes programs stored in memory 118. Circuit switching network 117 performs all of the communication switching as well as transferring control information between the different elements of telecommunication system 101 and computer 116. Trunk 121 is utilized to interconnect to public telephone switching network 108. One skilled in the art would readily realize that there would be a plurality of trunks such as trunk 121. WAN interface 113 and WAN interface 114 interface to WAN 107 and WAN 102, respectively. These WAN interfaces are also referred to as IP trunks. Tone generator 119 is utilized by computer 116 to generate the various tones utilized by the different embodiments.

Operating system 122 provides overall control for computer 116. Data is stored in data 123. Call processing 124 provides all of the normal call processing operations that are well known to those skilled in the art for a telecommunication switching system. Testing application 126 provides the operations required by the various embodiments.

In the following example a technician determining that there was audio artifacts being introduced into an audio conversation between analog telephone 106 and IP telephone 109 can troubleshoot this problem in the following manner. First the technician would utilize keystroke sequence on telephone 106 to have remote switch 104 implement an embodiment to give audio feedback on tests to the technician utilizing analog telephone 106. If no problems were noted in the testing by remote switch 104, which is testing the packet transmission of WAN 102, then the technician utilizing analog telephone 106 could, by a sequence of other keystrokes, request that telecommunication switching system 101 perform an embodiment to determine if the problem was occurring in WAN 107.

If the technician was utilizing IP telephone 103, IP telephone 103 could implement an embodiment that would allow the testing of WAN 102 with audio or visual feedback being given to the technician directly from IP telephone 103. If this stage of testing indicated that the problem was not in WAN 102, the technician could utilize a sequence or a single keystroke on IP telephone 103 to request that telephone switching system 101 implement an embodiment that would perform the testing on information being received from WAN 107.

In addition, if analog or ISDN telephone 112 was experiencing audio artifacts, the technician could utilize telephone set 112 to determine if there was a packet transmission problem in WAN 102 or WAN 107. Note, that the detection of packet loss, jitter, reorder, etc. is performed by WAN interfaces 113 and 114 which are part of telecommunication switching system 101. WAN interfaces 113 and 114 will transmit the information concerning packet loss, jitter, reordering, etc. to computer 116 via circuit switching network 117. Computer 116 then utilizes testing application 126 to determine if a test has been required for any of these items. If a test has been requested for any of these items, testing application 126 indicates the results of the test on a telecommunication device such as telephone 112 or IP telephone 103 utilizing the display or audio means appropriate for that particular telecommunication terminal.

Figure 2:
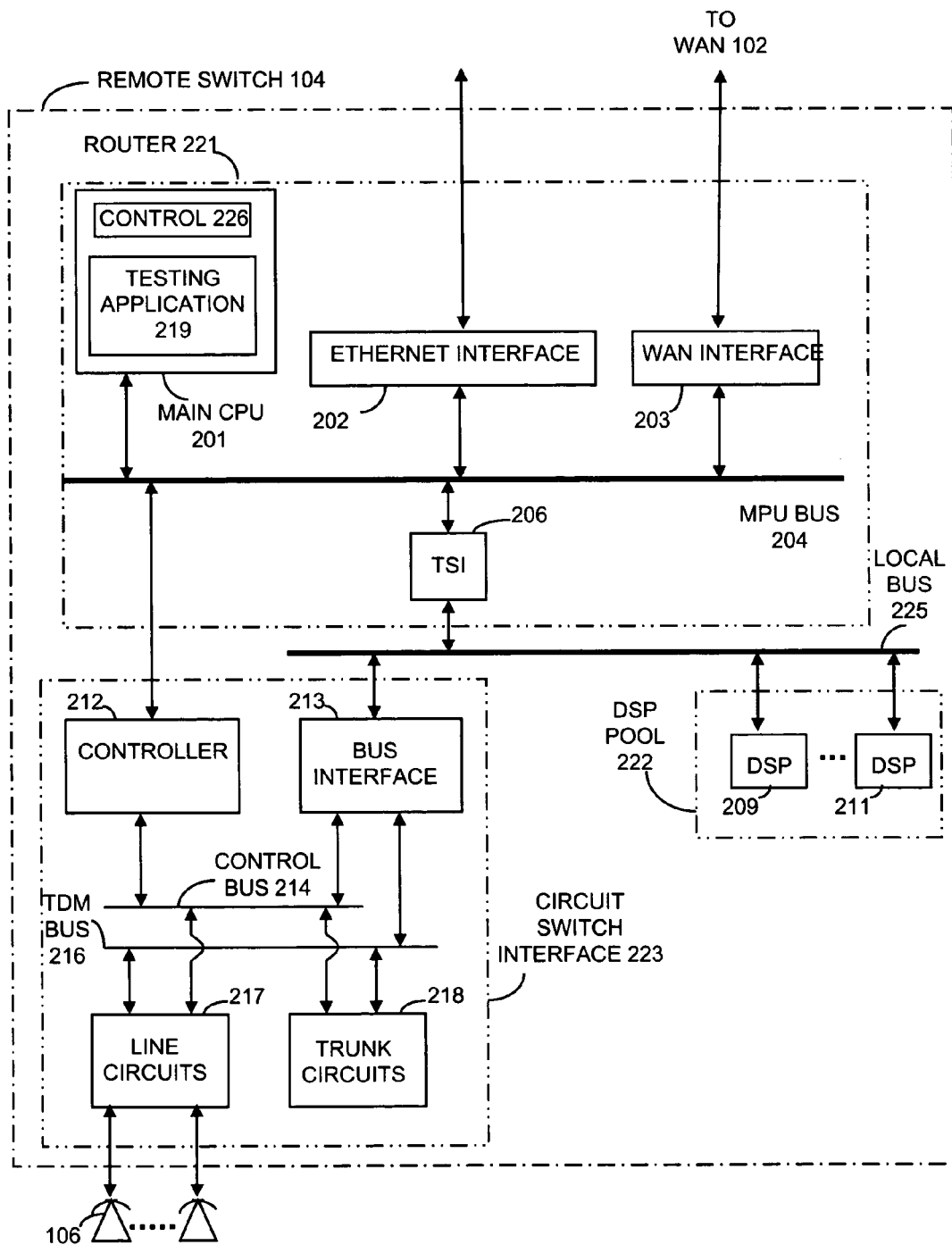
FIG. 2 illustrates, in block diagram form, an embodiment of a remote switch.

FIG. 2 illustrates in greater detail remote switch 104. DSP pool 222 consists of DSPs 209-211 which are controlled by main CPU 201 via MPU bus 204. Router 221 comprises main CPU 201 that provides overall control of remote switch 104. Main CPU 201 executes control software module 226 and testing application 219. Time slot interchange (TSI) 206 provides a mechanism for interexchanging time slots on local bus 225 and MPU bus 204. In addition, TSI 206 can be utilized to interexchange time slots that are being received from telecommunication terminals such as telephone set 104 via line circuits 217 and trunk circuits 218. This provides remote switch 104 with the capability of performing local circuit switching. Ethernet interface 202 may be used to interface to the Internet. WAN interface 203 interconnects bus 204 to WAN 102. Bus 204 is the overall informational highway that is used to communicate both control and bearer information within router 221.

DSP pool 222 comprises DSPs 209-211 that are under control of main CPU 201 to perform the necessary coding and conversion tasks.

Circuit switch interface 223 comprises elements 212-218. Controller 212 provides overall control of circuit switch interface 223. Bus interface 213 interfaces control bus 214 and TDM bus 216 with local bus 225. Control bus 214 is utilized to communicate control information between line circuits 217 and trunk circuits 218 and controller 212. TDM bus 216 is utilized to communicate digitally encoded speech or data samples with line circuits 217 and trunk circuits 218. Line circuits 217 are utilized to provide termination for telecommunication terminals; whereas, trunk circuits 218 terminate trunks with the public telephone switching network 101.

Software module control 226 provides the overall control of remote switch 104 in response to stimuli received from units that are part of remote switch 104 and from control messages received from main telecommunication switching system 101. If a user is utilizing telephone 106 to perform one of the testing operations, software module control 226 detects the input information and transfers control to testing application 219. Testing application 219 requests the information such as jitter from WAN interface 203 or if Internet interface 202 is being utilized, it will request it from that interface. Testing application 219 then utilizes a DSP from DSP pool 222 to generate the necessary tones for indicating to the user of telephone 106 the results of the requested test. Note, if telephone 106 has a digital display or indicator lights, testing application 219 may utilize the digital display or indicator lights to indicate the test results to the user. The operations performed by testing application 219 are illustrated in greater detail in FIG. 4.

Figure 3:
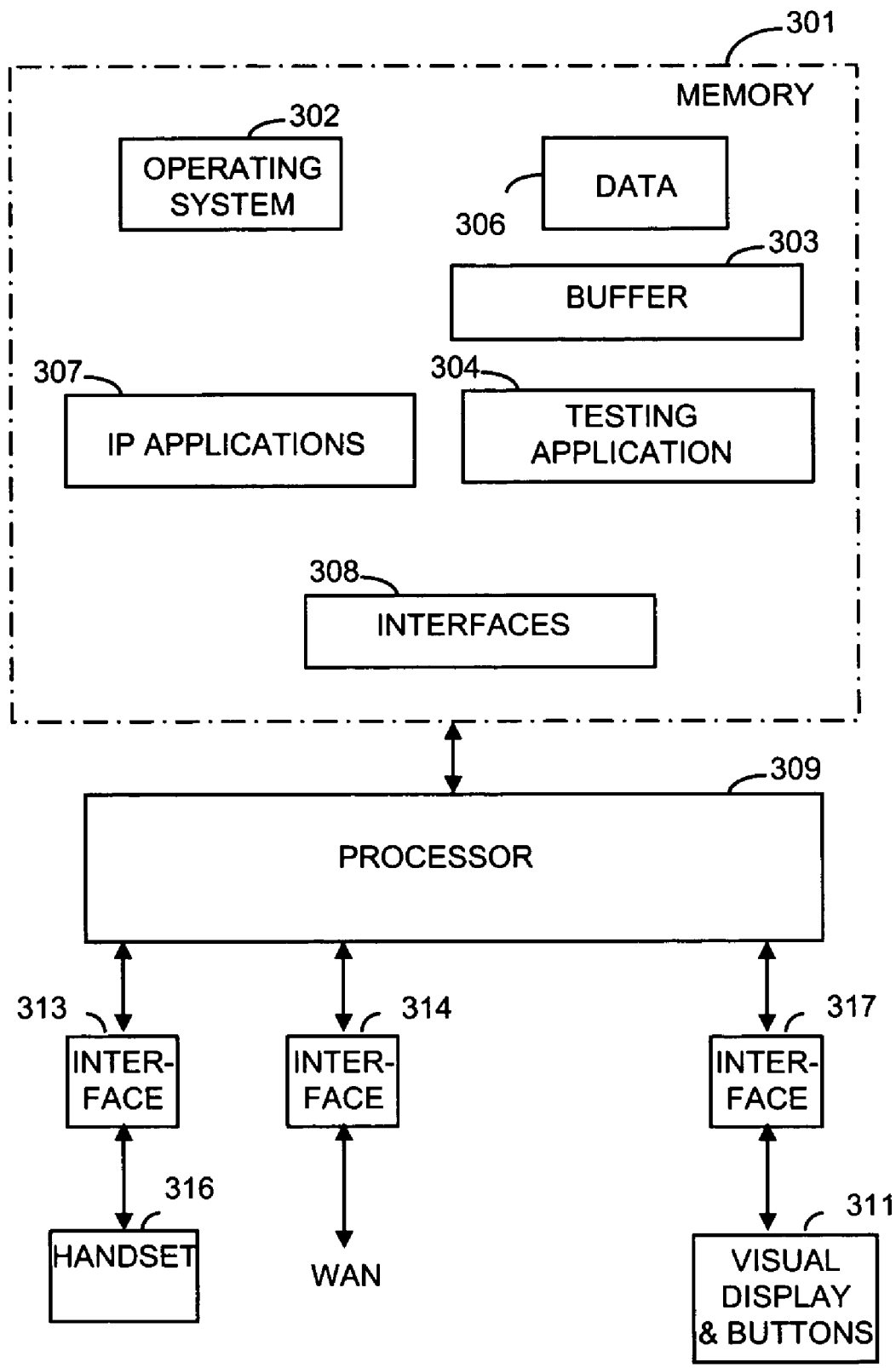
FIG. 3 illustrates, in block diagram form, an embodiment of an IP telephone.

FIG. 3 illustrates, in block diagram form, an embodiment of an IP telephone such as IP telephone 103 or 109. Processor 309 controls the operations of the IP telephone by executing applications stored in memory 301 utilizing data also stored there. Processor 309 communicates information with handset 316 via interface 313 and communicates with LAN 102 or 107 via interface 314. The IP telephone also has a visual display, buttons, and alerting means to provide signaling to and from the user. These visual displays, buttons, etc. are illustrated as block 311. Processor 309 communicates with block 311 via interface 317.

To perform the operations of an IP telephone, processor 309 executes IP applications 307 stored in memory 301. The overall control of the IP telephone is provided by execution of operating system 302 by processor 309. To perform the testing operations (if performed by the IP telephone) processor 309 executes testing application 304. Processor 309 utilizes data 306 for the storage of various types of parameters and information. Buffer 303 is used to provide storage for audio information. To communicate with interfaces 313, 314 and 317, processor 309 executes interfaces application 308.

Figure 4:
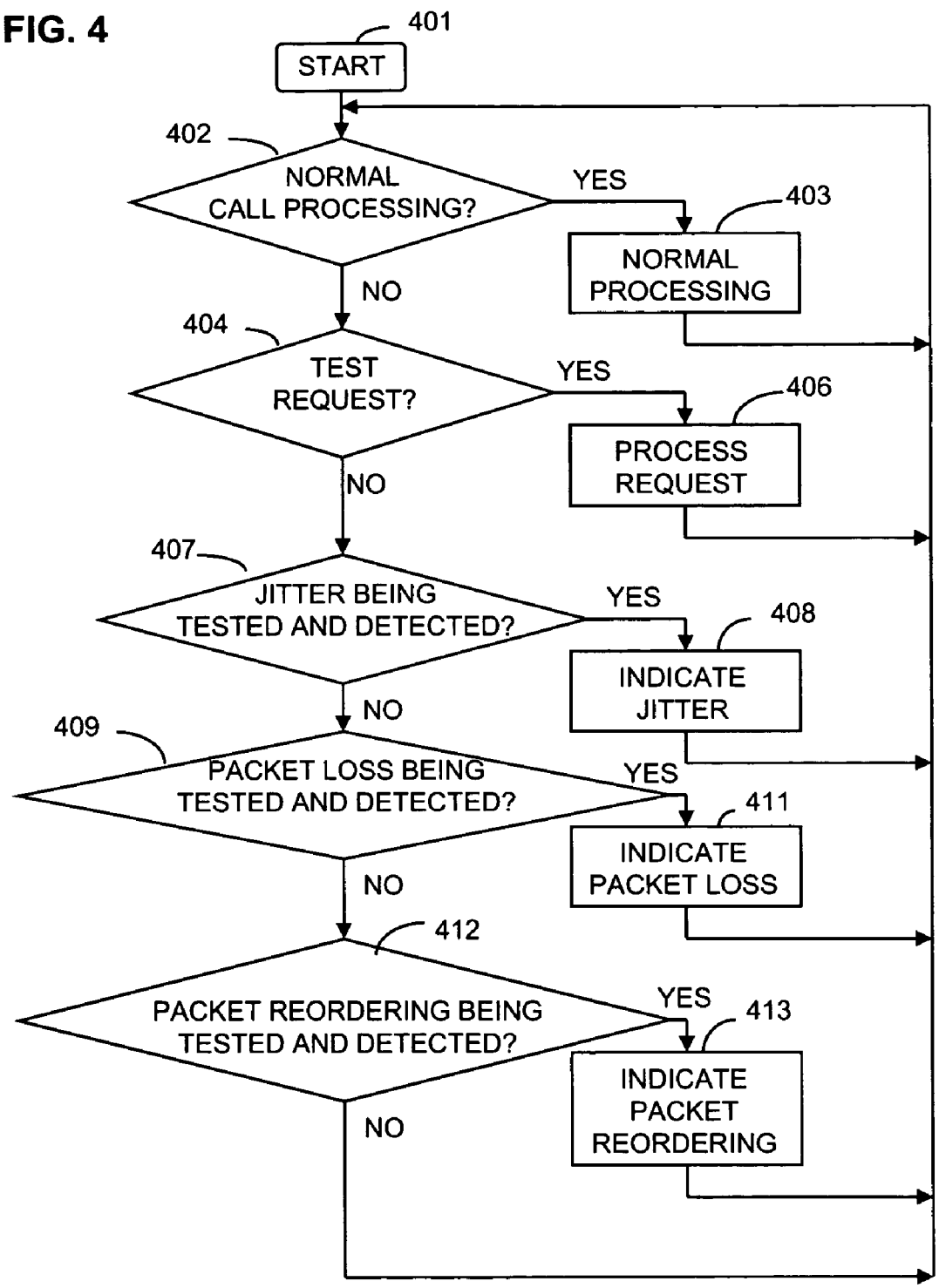
FIG. 4 illustrates, in flowchart form, operations performed by embodiment 400.

Embodiment 400 of FIG. 4 illustrates, in flowchart form, operations performed by the various embodiments. The operations illustrated in FIG. 4 may be performed by telecommunication switching system, a public telephone switching network, a remote switch, and an IP telephone. After being started in block 401, block 402 determines if normal call processing is to be performed. If the answer is yes, control is transferred to block 403 which performs the normal processing before transferring control back to decision block 402. If the answer is no in decision block 402, decision block 404 determines if a test request has been received. If a test request has been received, block 406 processes the request to set up the testing before transferring control back to decision block 402. Note that the test request may be in the form of multi-frequency dialing tones or may be the actuation of a button on a telephone set. Decision block 404 also processes requests from users to end testing of a particular test and if the end of a test is requested it is also processed by process request block 406.

If the answer in decision block 404 is no, decision block 407 determines if a WAN interface has indicated the results of a requested jittering test. If a jitter test has been requested and jitter detected, control is transferred to block 408 which indicates the results of the jitter test to the user. As previously noted, the results of the test may be indicated utilizing an audio wave form, a message on a digital display, or indicators on a telephone. After execution of block 408, control is transferred back to block 402. If the answer in decision block 407 is no, decision block 409 determines if a packet loss test has been requested and if packet loss has been detected by a WAN interface. If the answer is yes in decision block 409, block 411 indicates the extent of the packet loss before transferring control back to decision block 402.

If the answer in decision block 409 is no, decision block 412 determines if a packet reordering test had been requested and if packet reordering had been detected. If the answer is yes in decision block 412, block 413 indicates the packet reordering test results before transferring control back to decision block 402. If the answer in decision block 412 is no, control is transferred back to decision block 402.

When the operations of an information system are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The information system can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the information system is implemented in hardware, the information system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for testing a packet switching system, comprising the steps of:
   requesting one of a plurality of tests on the packet switching system via a telephone set wherein the one of the plurality of tests is to test for jitter;
   performing the requested one of the plurality of tests on the packet switching system;
   generating a first and second audio tones that are equal in frequency;
   adjusting the phase of the second audio tone by the magnitude of the jitter whereby absent jitter the second audio tone is 180 degrees out of phase with the first audio tone;
   mixing the first and second audio tones together; and
   transmitting the mixed audio tones to the telephone set whereby the mixed audio tones represent results of the performed one of the plurality of tests as audio information; and
   presenting the results of the performed one of the plurality of tests as the audio information on the telephone set.

2. A method for testing a packet switching system, comprising the steps of:
   requesting one of a plurality of tests on the packet switching system via a telephone set wherein the one of the plurality of tests is to test for packet re-ordering;
   performing the requested one of the plurality of tests on the packet switching system;
   generating an audio tone pulse whose at least one of length or volume indicates a delay experienced by a re-ordered packet;
   transmitting the audio pulse tone to the telephone set whereby the audio pulse tone represents results of the performed one of the plurality of tests as audio information; and
   presenting the results of the performed one of the plurality of tests as the audio information on the telephone set.

3. An apparatus for implementing the steps of claim 2.

4. A method for testing a packet switching system, comprising the steps of:
   requesting one of a plurality of tests on the packet switching system via a telephone set wherein the one of the plurality of tests is to test for packet loss;
   performing the requested one of the plurality of tests on the packet switching system;
   generating an audio tone pulse whose at least one of length or volume indicates a number of packets lost;
   transmitting the audio pulse tone to the telephone set whereby the audio pulse tone represents results of the performed one of the plurality of tests as audio information; and
   presenting the results of the performed one of the plurality of tests as the audio information on the telephone set.

5. An apparatus for implementing the steps of claim 4.

6. A non-transitory processor-readable medium for testing a packet switching system, comprising processor-executable instructions configured for:
- requesting one of a plurality of tests on the packet switching system via a telephone set wherein the one of the plurality of tests is to test for jitter;
- performing the requested one of the plurality of tests, on the packet switching system;
- generating a first and second audio tones that are equal in frequency;
- adjusting the phase of the second audio tone by the magnitude of the jitter whereby absent jitter the second audio tone is 180 degrees out of phase with the first audio tone;
- mixing the first and second audio tones together; and
- transmitting the mixed audio tones to the telephone set whereby the mixed audio tones represent results of the performed one of the plurality of tests as audio information; and
- presenting the results of the performed one of the plurality of tests as the audio information on the telephone set.

7. A non-transitory processor-readable medium for testing a packet switching system, comprising processor-executable instructions configured for:
- requesting one of a plurality of tests on the packet switching system via a telephone set wherein the one of the plurality of tests is to test for packet loss;
- performing the requested one of the plurality of tests a on the packet switching system;
- generating an audio tone pulse whose at least one of length or volume indicates a number of packets lost;
- transmitting the audio pulse tone to the telephone set whereby the audio pulse tone represents results of the performed one of the plurality of tests as audio information; and
- presenting the results of the performed one of the plurality of tests as the audio information on the telephone set.

8. A non-transitory processor-readable medium for testing a packet switching system, comprising processor-executable instructions configured for:
- requesting one of a plurality of tests on the packet switching system via a telephone set wherein the one of the plurality of tests is to test for packet loss;
- performing the requested one of the plurality of tests on the packet switching system;
- generating an audio tone pulse whose at least one of length or volume indicates a number of packets lost;
- transmitting the audio pulse tone to the telephone set whereby the audio pulse tone represents results of the performed one of the plurality of tests as audio information; and
- presenting the results of the performed one of the plurality of tests as the audio information on the telephone set.

\* \* \* \* \*